United States Patent
Hwang

(10) Patent No.: US 8,788,150 B2
(45) Date of Patent: Jul. 22, 2014

(54) SYSTEM AND METHOD FOR CONTROLLING A VEHICLE USING IN-WHEEL SYSTEM

(75) Inventor: Sungwook Hwang, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 203 days.

(21) Appl. No.: 13/534,896

(22) Filed: Jun. 27, 2012

(65) Prior Publication Data

US 2013/0110332 A1    May 2, 2013

(30) Foreign Application Priority Data

Oct. 31, 2011    (KR) .................. 10-2011-0112247

(51) Int. Cl.
| | |
|---|---|
| A01B 69/00 | (2006.01) |
| B62D 6/00 | (2006.01) |
| B62D 11/00 | (2006.01) |
| B62D 12/00 | (2006.01) |
| B63G 8/20 | (2006.01) |
| B63H 25/04 | (2006.01) |
| G06F 7/00 | (2006.01) |
| G06F 17/00 | (2006.01) |
| G06F 19/00 | (2011.01) |

(52) U.S. Cl.
USPC ............... 701/41; 701/42; 180/411; 180/412; 180/413; 180/443

(58) Field of Classification Search
USPC ........ 701/1, 36, 41, 42, 43, 44; 180/408, 411, 180/412, 413, 443; 280/5.51; 340/465; 116/31
See application file for complete search history.

(56) References Cited

U.S. PATENT DOCUMENTS

| | | | | |
|---|---|---|---|---|
| 5,857,160 | A * | 1/1999 | Dickinson et al. | 701/41 |
| 6,498,971 | B2 * | 12/2002 | Leaphart | 701/41 |
| 7,085,641 | B2 * | 8/2006 | Post, II | 701/70 |
| 8,474,842 | B2 * | 7/2013 | Shibuya | 280/93.51 |
| 2007/0050112 | A1 * | 3/2007 | Kroehnert et al. | 701/41 |
| 2010/0106375 | A1 * | 4/2010 | Ahmed et al. | 701/42 |
| 2011/0089657 | A1 * | 4/2011 | Shibuya | 280/93.512 |

FOREIGN PATENT DOCUMENTS

| | | |
|---|---|---|
| JP | 09117017 A | 5/1997 |
| JP | 2009220617 A | 10/2009 |
| JP | 2010259292 A | 11/2010 |
| JP | 2011139561 A | 7/2011 |

\* cited by examiner

*Primary Examiner* — Rami Khatib
(74) *Attorney, Agent, or Firm* — Edwards Wildman Palmer LLP; Peter F. Corless

(57) ABSTRACT

Disclosed is a system and method for controlling a vehicle using an in-wheel system which controls a motor mounted in each wheel of the vehicle independently. More specifically, a control unit is configured to determine a turning mode of the vehicle based on vehicle driving information, calculate a present Ackerman rate of the vehicle based on the determined turning mode, generate a control command based on the present Ackerman rate, and control the motor of each wheel using the control command, independently.

19 Claims, 5 Drawing Sheets

<Target yaw rate according to Ackerman rate>

SYSTEM AND METHOD FOR CONTROLLING A VEHICLE USING IN-WHEEL SYSTEM

CROSS-REFERENCE TO RELATED APPLICATION

This application claims priority to and the benefit of Korean Patent Application No. 10-2011-0112247 filed in the Korean Intellectual Property Office on Oct. 31, 2011, the entire contents of which are incorporated herein by reference.

BACKGROUND OF THE INVENTION (a) Field of the Invention

The present invention relates to a system and method for controlling a vehicle using an in-wheel system. More particularly, the present invention relates to a method for controlling a vehicle using an in-wheel system which can minimize a radius of rotation with turning stability by using Ackerman tendency steering principle.

(b) Description of the Related Art

An in-wheel system generally has an electric motor mounted within each wheel of a vehicle and directly controls driving of each wheel. The in-wheel system is normally used in a vehicle using an electric motor as a power source such as a hybrid vehicle, a fuel cell vehicle, and an electric vehicle.

In general, this type of steering apparatus is provided for controlling a direction of travel of a vehicle. The steering apparatus transfers power from a gear apparatus to front wheels of the vehicle and includes a tie rod and a knuckle arm for supporting a relational position between left and right wheels.

The steering apparatus generally follows an Ackerman tendency steering principle. An Ackerman geometry condition can be established between a rack stroke generated by steering angle and tire angle, and an Ackerman angle and an Ackerman rate can be defined as mentioned below under the Ackerman geometry condition.

The Ackerman angle can be defined as a tire angle of the outer wheel when the normal lines of the front wheel and the rear wheel pass through a center of pivot, and the Ackerman rate can be defined as the ratio (%) between a theoretical Ackerman angle and a real tire angle generated in actual driving. The Ackerman angle and the Ackerman rate may be calculated by a formula shown in FIG. 1.

It would be ideal if the Ackerman rate is 100%, but in actuality the Ackerman rate is designed to be 40-80% according to steering angle based on some limiting conditions with other link parts. If the Ackerman rate is not properly applied, some problems such as tire drag or degraded steering sensing may occur.

In the case of the conventional art, as shown in FIG. 1, a centrifugal force is applied to the vehicle when the vehicle is turned. A cornering force is applied to the tire of the vehicle and tire slip occurs to offset the centrifugal force. The Ackerman geometry condition cannot be satisfied when the tire slippage occurs since the center of pivot (O) moves to an upper position (O') due to the tire slip. As a result tire drag occurs in the conventional art and steering sensing is degraded. Further, as shown in FIG. 2, the conventional art has a problem that the Ackerman rate falls when the vehicle is turned normally since the steering angle is quite small in normal turns.

On the other hand, a large outer wheel angle is more advantageous for minimizing a radius of rotation when the vehicle requires turning with a minimum radius of rotation. In this case, the steering angle should be larger so as to minimize the radius of rotation, and when the steering angle becomes larger, then the Ackerman rate increases as shown in FIG. 2.

However, according to the Ackerman rate formula shown in FIG. 1, the Ackerman rate has a large value when the inner wheel angle is greater than the outer wheel angle. As a result, in the conventional art, it is difficult to minimize a radius of rotation by maintaining turning stability, since the outer wheel angle should be smaller to increase the Ackerman rate and it is disadvantageous for minimizing the radius of rotation.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a system and method for controlling a vehicle using an in-wheel system having advantages of improving turning stability and minimizing a radius of rotation via an Ackerman function.

An exemplary embodiment of the present invention provides a system and method for controlling a vehicle using an in-wheel system which controls a motor mounted in each wheel of the vehicle. In particular, a control unit may be configured to determine a turning mode of the vehicle based on vehicle driving information and calculate a present Ackerman rate of the vehicle corresponding to the turning mode. The control unit may then generate a control command based on the present Ackerman rate, and control the motor of each wheel using the control command, respectively.

The control command may be generated by comparing a present yaw rate of the vehicle with a target yaw rate depending on the present Ackerman rate of the vehicle when the turning mode is in a turning stability improvement mode (i.e., a first mode). The control command may be generated by calculating a minimum turning radius of the present Ackerman rate and comparing the minimum turning radius of the present Ackerman rate with a minimum turning radius of a 100% Ackerman rate when the turning mode is a turning radius minimization mode (i.e., a second mode).

In some exemplary embodiments of the present invention, the driving information may include at least one of a steering angle, a steering angular speed, a vehicle speed, and a yaw rate. The present Ackerman rate may be calculated by considering at least one of a rack-pinion steering gear ratio, a tire angle, a steering angle, and data of the vehicle, and the target yaw rate may be calculated based on at least one of the present Ackerman rate of the vehicle, a steering angle, and a vehicle speed. Furthermore, the minimum turning radius of the present Ackerman rate may be calculated based on at least one of a rack-pinion steering gear ratio, a tire angle, a steering angle, and data of the vehicle.

According to an exemplary embodiment of the present invention, turning stability of a vehicle may be improved by maintaining a high Ackerman rate and a radius of rotation may be minimized by controlling a torque of each wheel independently using in-wheel motors. In addition, the driving performance of the vehicle may be improved by controlling a torque of each wheel independently.

DESCRIPTION OF SYMBOLS

10: in-wheel system
100: hub
200: in-wheel motor
300: decelerator

DETAILED DESCRIPTION OF THE EMBODIMENTS

An exemplary embodiment of the present invention will hereinafter be described in detail with reference to the accompanying drawings.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum).

Furthermore, control logic utilized to execute the exemplary embodiments of the present invention may be embodied as non-transitory computer readable media on a computer readable medium containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

Furthermore, the control unit described herein may be embodied as a single control unit or as a plurality of control units without departing from the overall concept and intent of the illustrative embodiment of the present invention. Since any well known control unit capable of performing advanced calculations may be utilized by the illustrative embodiment of the present invention, a description and figure depicting the control unit has been omitted.

Figure 3:
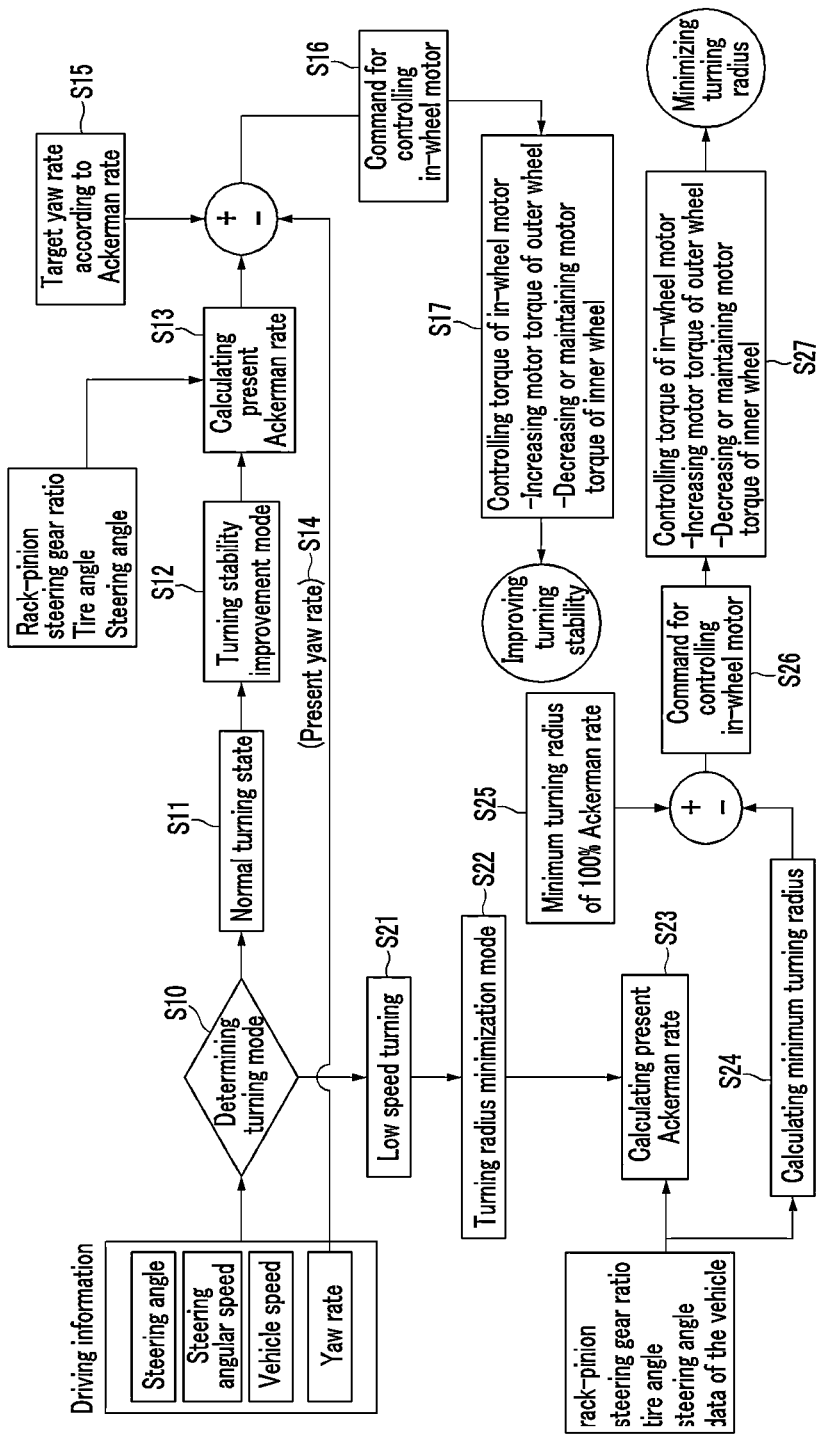
FIG. 3 is a flowchart of a method for controlling a vehicle using an in-wheel system according to an exemplary embodiment of the present invention.

FIG. 3 is a flowchart of a method for controlling a vehicle using an in-wheel system according to an exemplary embodiment of the present invention. As shown in FIG. 3, a method for controlling a vehicle using an in-wheel system which controls a motor mounted in each wheel of the vehicle (hereinafter, an "in-wheel motor") may include: determining, by a control unit, a turning mode of the vehicle based on vehicle driving information at step S10; calculating, by the control unit, a present Ackerman rate of the vehicle corresponding to the determined turning mode at steps S13 and S23; generating a control command based on the present Ackerman rate at steps S16 and S26; and controlling the motor of each wheel in the system using the control command, respectively, at steps S17 and S27.

Figure 4:
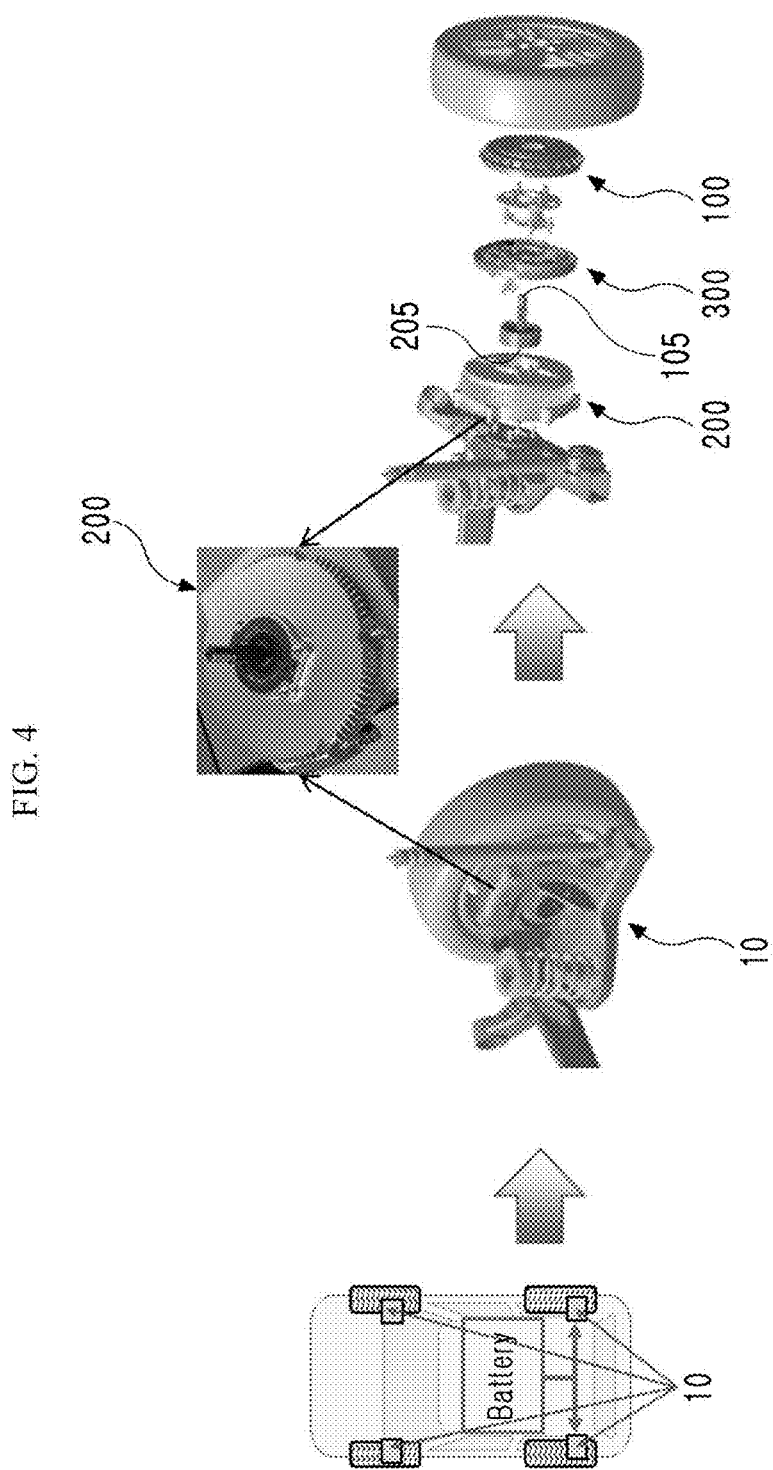
FIG. 4 is a schematic diagram of an in-wheel system according to an exemplary embodiment of the present invention.

An in-wheel system is a system that controls each wheel of the vehicle respectively by operating an electric motor mounted in each wheel, respectively. As shown in FIG. 4, according to an exemplary embodiment of the in-wheel system, motors may be respectively mounted in the left and right wheels of the front and rear wheels, and the torque of each motor is independently controlled.

As shown in FIG. 4, in one or a plurality of exemplary embodiments, the in-wheel system 10 may include a wheel hub 100 configured to rotate with an output shaft 105 of wheel, a motor 200 configured to rotate an input shaft 205 connected to the output shaft 105 and mounted in the wheel, and a decelerator 300 for decelerating rotation speed of the input shaft 205 arranged between the input shaft and the output shaft 105.

The motor 200 mounted in each wheel may be controlled independently so that the driving performance of the vehicle may be improved by appropriately distributing torque of each wheel. For example, the vehicle may be steered using a lateral force generated by controlling a different torque between left and right wheels.

At step S10, a turning mode is determined based on the vehicle driving information as shown in FIG. 3. In one or a plurality of exemplary embodiments, the turning mode may include a turning stability improvement mode S12 and a turning radius minimization mode S22. The turning stability improvement mode S12 may be applied when the vehicle is in the normal turning state S11. In other words, the turning stability improvement mode S12 is applied when the vehicle is driving, e.g., on a curved road. On the other hand, the turning radius minimization mode S22 may be applied when the vehicle needs to drive slowly S21 with a minimum turning radius, e.g., when parking or making a U-turn.

The driving information used in determining the turning mode may include at least one of steering angle, steering angular speed, vehicle speed, and yaw rate. The vehicle speed, the steering angle, the steering angular speed, etc. may be measured by using sensors. The yaw rate refers to a value representing a turning degree of a vehicle turn and is measured by using, e.g., a yaw rate sensor mounted in the vehicle.

Generally, the steering angle, the steering angular speed, and the yaw rate are larger in the turning radius minimization mode S22 than in the turning stability improvement mode S12, and the velocity is lower in the turning radius minimization mode S22 than in the turning stability improvement mode S12. Thus, at step S10, the turning mode of the vehicle can be determined based on the above-mentioned driving information.

Additionally, in the exemplary embodiment of the present invention, the present Ackerman rate of the vehicle is calculated based on the turning mode at steps S13 and S23 once the turning mode is determined, a control command is generated based on the present Ackerman rate at steps S16 and S26, and an in-wheel motor of each wheel is controlled independently using the control command at steps S17 and S27.

At step S13, when the turning mode is a turning stability improvement mode S12, a present Ackerman rate of the vehicle is calculated corresponding to the turning stability improvement mode. The Ackerman rate refers to the ratio between a theoretical Ackerman angle and a real tire angle generated during actual driving, and the Ackerman angle refers to a tire angle of the outer wheel when the normal lines of the front wheel and the rear wheel pass through a center of turning.

The present Ackerman rate may be calculated considering at least one of a rack-pinion steering gear ratio, tire angle, steering angle, and data of the vehicle. Generally, a vehicle has a pinion steering gear in the end of the steering shaft of the steering apparatus, and a rack gear which controls the direction of wheel by moving left or right communicated with the pinion gear. The rack-pinion steering gear ratio refers to a ratio between the rack steering gear and the pinion steering gear.

Figure 1:
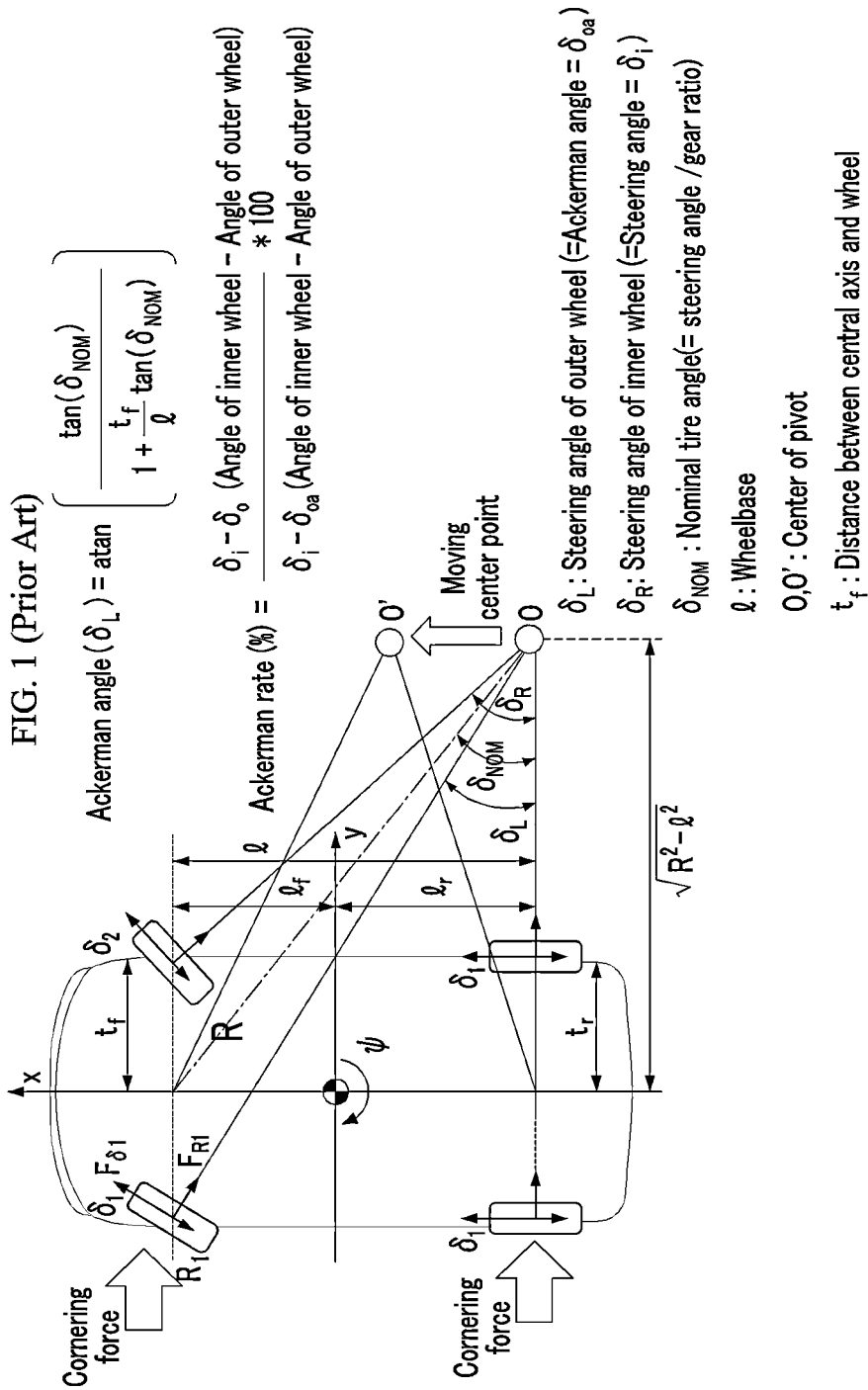
FIG. 1 is a schematic diagram showing a formula for calculating Ackerman angle and Ackerman rate.
Figure 2:
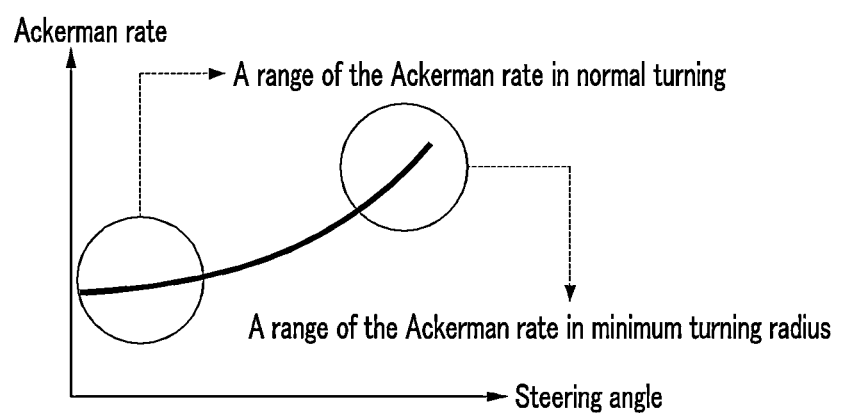
FIG. 2 is a graph showing a relationship between steering angle and Ackerman rate.

Further, the present Ackerman rate may be calculated by the formula of Ackerman angle and Ackerman rate shown in FIG. 1. Then, at step S16, the control command is generated based on a comparison between a present yaw rate of step S14 and a target yaw rate according to the present Ackerman rate of step S15.

The present yaw rate of step S14 refers to a value representing turning degree of the present vehicle turn, and may be measured by using a yaw rate sensor mounted in the vehicle.

Figure 5:
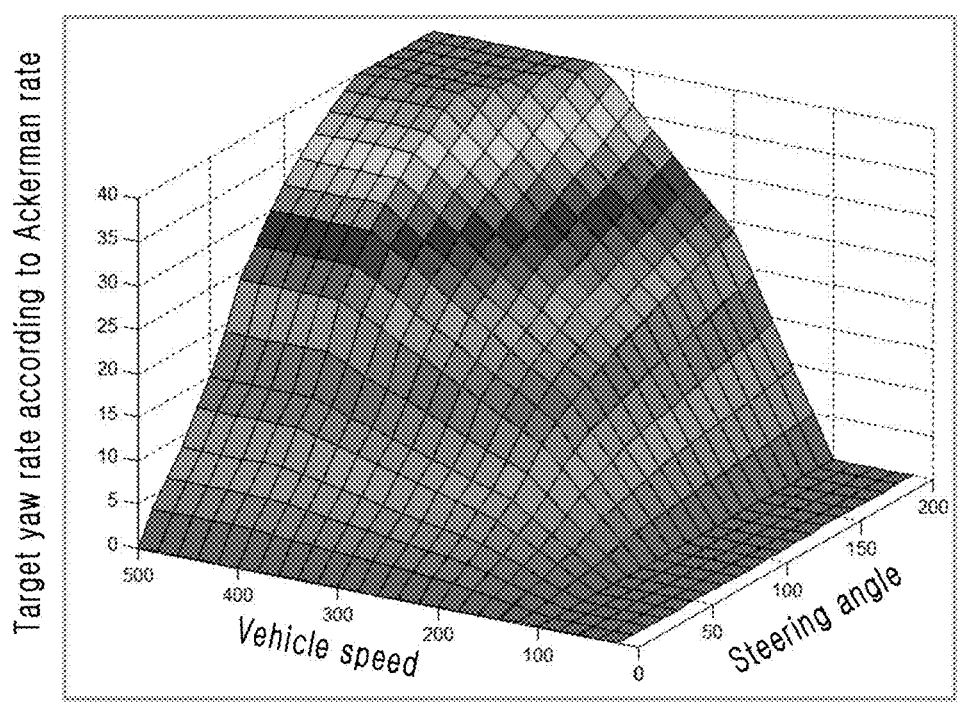
FIG. 5 is graph showing a relationship between Ackerman rate and yaw rate.

The target yaw rate, on the other hand, is determined according to the present Ackerman rate at step S15. In one or a plurality of exemplary embodiments, the target yaw rate may be calculated considering at least one of the present Ackerman rate of the vehicle, steering angle, and vehicle speed. As shown in FIG. 5, a three-dimensional map can be made in advance with respect to the relationships among the target yaw rate according to the Ackerman rate, the vehicle speed, and the steering angle.

At step S16, the control command is generated based on a comparison between the target yaw rate and the present yaw rate. More particularly, the control command is a command that controls each motor respectively mounted in each wheel independently. In one or a plurality of exemplary embodiments, the control commands may be generated as the present yaw rate follows the target yaw rate.

At step S17, the in-wheel motor mounted in each wheel is controlled respectively by the generated control command to equalize the present yaw rate and the target yaw rate. In other words, the in-wheel motor is controlled respectively to offset the difference between the present yaw rate and the target yaw rate.

In one or a plurality of exemplary embodiments, the difference between the present yaw rate and the target yaw rate may decrease and turning stability may be improved by increasing the torque of the in-wheel motor mounted in the outer wheel and decreasing or maintaining the torque of the in-wheel motor mounted in the inner wheel, at step S17.

On the other hand, at step S23, when the turning mode is the turning radius minimization mode S22, a present Ackerman rate of the vehicle may be calculated corresponding to the turning radius minimization mode. The present Ackerman rate may be calculated considering at least one of a rack-pinion steering gear ratio, a tire angle, a steering angle, and data of the vehicle. Then, a minimum turning radius of the present Ackerman rate may be calculated at step S24. The minimum turning radius of the present Ackerman rate may be calculated considering at least one of a rack-pinion steering gear ratio, a tire angle, a steering angle, and data of the vehicle.

At step S26, a control command may be generated based on a comparison between the minimum turning radius of the present Ackerman rate and a minimum turning radius of a 100% Ackerman rate at step S25 when the minimum turning radius of the present Ackerman rate is calculated at step S24. The control command is a command that controls each motor respectively mounted in each wheel independently. In one or a plurality of exemplary embodiments, at step S26, the control command may be generated as the minimum turning radius of the present Ackerman rate that follows the minimum turning radius of a 100% Ackerman rate.

At step S27, the in-wheel motor mounted in each wheel is controlled respectively by the generated control command so as to convert the minimum turning radius of the present Ackerman rate into the minimum turning radius with a 100% Ackerman rate. In other words, the in-wheel motor is controlled respectively to offset the difference between the minimum turning radius of the present Ackerman rate with the minimum turning radius of a 100% Ackerman rate. In one or a plurality of exemplary embodiments, the turning radius may be minimized by increasing the torque of the in-wheel motor mounted in the outer wheel and decreasing or maintaining the torque of the in-wheel motor mounted in the inner wheel, at step S27.

Generally a driving condition in which the turning radius minimization mode S22 is required occurs at low speeds such as while parking or completing a U-turn, at step S21. In the case of the conventional art, turning stability can be improved in these situations by increasing the Ackerman rate, but disadvantageously the radius of rotation is minimized because the tire angle of the outer wheel becomes less than that of the inner wheel in a high Ackerman rate of the conventional art and the small tire angle of the outer wheel makes it difficult for the vehicle to minimize the radius of rotation.

However, the present invention allows for control the torque of the outer wheel and the inner wheel respectively by controlling each in-wheel motor of each wheel in the turning radius minimization mode in S22 so that the present invention can minimize the radius of rotation with degrading turning stability. Thus, according to an exemplary embodiment of the present invention, turning stability of a vehicle may be improved by maintaining a high Ackerman rate and the radius of rotation may be minimized by controlling torque of each wheel independently using the in-wheel motors.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method for controlling a vehicle using an in-wheel system which controls a motor mounted in each wheel of the vehicle, comprising:
   determining, by a control unit, a turning mode of the vehicle based on vehicle driving information;
   calculating, by the control unit, a present Ackerman rate of the vehicle based on the determined turning mode;
   generating, by the control unit, a control command based on the present Ackerman rate; and
   controlling independently, by the control unit, the motor of each wheel using the control command, respectively.

2. The method of claim 1, wherein the control command is generated by comparing a present yaw rate of the vehicle with a target yaw rate depending on the present Ackerman rate of the vehicle when the turning mode is in a first mode.

3. The method of claim 2, wherein the target yaw rate is calculated based on at least one of the present Ackerman rate of the vehicle, a steering angle, and a vehicle speed.

4. The method of claim 1, wherein the control command is generated by calculating a minimum turning radius of the present Ackerman rate and comparing the minimum turning radius of the present Ackerman rate with a minimum turning radius of a 100% Ackerman rate when the turning mode is in a second mode.

5. The method of claim 4, wherein the minimum turning radius of the present Ackerman rate is calculated based on at least one of a rack-pinion steering gear ratio, a tire angle, a steering angle, and data of the vehicle.

6. The method of claim 1, wherein the vehicle driving information includes at least one of a steering angle, a steering angular speed, a vehicle speed, and a yaw rate.

7. The method of claim 1, wherein the present Ackerman rate is calculated based on at least one of a rack-pinion steering gear ratio, a tire angle, a steering angle, and data of the vehicle.

8. A non-transitory computer readable medium containing program instructions executed by a control unit, the computer readable medium comprising:
  program instructions that determine a turning mode of the vehicle based on vehicle driving information;
  program instructions that calculate a present Ackerman rate of the vehicle based on the determined turning mode;
  program instructions that generate a control command based on the present Ackerman rate; and
  program instructions that independently control the motor of each wheel using the control command, respectively.

9. The non-transitory computer readable medium of claim 8, wherein the control command is generated by comparing a present yaw rate of the vehicle with a target yaw rate depending on the present Ackerman rate of the vehicle when the turning mode is in a first mode.

10. The non-transitory computer readable medium of claim 9, wherein the target yaw rate is calculated based on at least one of the present Ackerman rate of the vehicle, a steering angle, and a vehicle speed.

11. The non-transitory computer readable medium of claim 8, wherein the control command is generated by calculating a minimum turning radius of the present Ackerman rate and comparing the minimum turning radius of the present Ackerman rate with a minimum turning radius of a 100% Ackerman rate when the turning mode is in a second mode.

12. The non-transitory computer readable medium of claim 11, wherein the minimum turning radius of the present Ackerman rate is calculated based on at least one of a rack-pinion steering gear ratio, a tire angle, a steering angle, and data of the vehicle.

13. The non-transitory computer readable medium of claim 8, wherein the vehicle driving information includes at least one of a steering angle, a steering angular speed, a vehicle speed, and a yaw rate.

14. The non-transitory computer readable medium of claim 8, wherein the present Ackerman rate is calculated based on at least one of a rack-pinion steering gear ratio, a tire angle, a steering angle, and data of the vehicle.

15. A system for controlling a vehicle using an in-wheel system which controls a motor mounted in each wheel of the vehicle, comprising:
  a control unit configured to determine a turning mode of the vehicle based on vehicle driving information, calculate a present Ackerman rate of the vehicle based on the determined turning mode, generate a control command based on the present Ackerman rate, and independently control the motor of each wheel using the control command, respectively.

16. The system of claim 15, wherein the control command is generated by comparing a present yaw rate of the vehicle with a target yaw rate depending on the present Ackerman rate of the vehicle when the turning mode is in a first mode.

17. The system of claim 15, wherein the control command is generated by calculating a minimum turning radius of the present Ackerman rate and comparing the minimum turning radius of the present Ackerman rate with a minimum turning radius of a 100% Ackerman rate when the turning mode is in a second mode.

18. The system of claim 15, wherein the vehicle driving information includes at least one of a steering angle, a steering angular speed, a vehicle speed, and a yaw rate, and the present Ackerman rate is calculated based on at least one of a rack-pinion
  steering gear ratio, a tire angle, a steering angle, and data of the vehicle.

19. The system of claim 16, wherein the target yaw rate is calculated based on at least one of the present Ackerman rate of the vehicle, a steering angle, and a vehicle speed, and the minimum turning radius of the present Ackerman rate is calculated based on at least one of a rack-pinion steering gear ratio, a tire angle, a steering angle, and data of the vehicle.

* * * * *